United States Patent
Tseng

[19]

[11] Patent Number: 5,961,136
[45] Date of Patent: Oct. 5, 1999

[54] CONNECTING CANTILEVER STRUCTURE FOR BICYCLE MUD-GUARDS

[76] Inventor: Shao-Chien Tseng, No. 130 Sec 2. Yang-Shin Rd., Yang-Mei Taoynan 326, Taiwan

[21] Appl. No.: 08/891,682

[22] Filed: Jul. 11, 1997

[51] Int. Cl.[6] ................................................. B62D 25/18
[52] U.S. Cl. ................................... 280/152.3; 280/152.1; 224/453; 74/579 R
[58] Field of Search ................................ 280/852, 152.1, 280/152.2, 152.3, 288.4, 160.1; 224/419, 420, 427, 42.31, 453; 74/579 R; 29/897.2, 890.147; 83/859, 701

[56] References Cited

U.S. PATENT DOCUMENTS

| | | | |
|---|---|---|---|
| 2,179,432 | 11/1939 | Schroeder et al. | 280/33.15 |
| 3,572,758 | 3/1971 | Lee | 280/296 |
| 4,319,763 | 3/1982 | White | 280/152.3 |
| 4,428,993 | 1/1984 | Kohn et al. | 428/117 |
| 5,112,071 | 5/1992 | Jones | 280/152.3 |
| 5,322,311 | 6/1994 | Dunn | 280/152.1 |
| 5,354,082 | 10/1994 | Tsai | 280/152.1 |
| 5,395,017 | 3/1995 | Naughton | 224/39 |
| 5,461,767 | 10/1995 | Okubo | 29/454 |
| 5,860,577 | 1/1999 | Dunn | 224/453 |

Primary Examiner—Robert J. Oberleitner
Assistant Examiner—Dan Yeagley
Attorney, Agent, or Firm—Pro-Techtor International Services

[57] ABSTRACT

A connecting cantilever structure for bicycle mud-guards, wherein, the connecting cantilever is closed die forged on a contracting annulus which is slipped over the pipe for mounting the post pipe of the bicycle seat, the connecting cantilever is forged to form an inversed "U" groove of which the bottom and the tailing end are all opened and the lateral inner side walls are all forged to form unsymmetric undulated and reinforced walls, the top surface thereof is formed to be provided with a slot having a stroke length, a screw, a gasket and a nut are locked mutually in the slot to mount a mud-guard integrately connected with a shelf, the connecting cantilever can completely absorb the stresses from the normal and deviated action force introduced at the ends of the mudguards, thus stability of the mud-guard which is mounted by single point locking can be enhanced.

1 Claim, 2 Drawing Sheets

CONNECTING CANTILEVER STRUCTURE FOR BICYCLE MUD-GUARDS

BACKGROUND OF THE INVENTION

1. Field of the Invention

The present invention is related to a connecting cantilever structure for the mud-guards on a bicycle, and especially to the connecting cantilever structure for mounting a mud-guard on the top of either wheels on the bicycle, which connecting cantilever structure can be enhanced for its stability only by single point locking.

2. Description of the Prior Art

In a common bicycle, the front and the rear wheels thereof is provided on the top thereof with mud-guards which must be kept a distance away from the wheels, in order not to interfere the wheels when the latter are running, while the mud-guards must stop mud and dirt from flying up together with the rotating wheels, therefore, manufacturers normally do the assembling work of the mud-guards very carefully; however, a mud-guard has quite a long arciform length for efficiently stopping mud, and the manufactures always use thinner metallic sheets to form the mud-guards by punching, the mud-guards hence are lack of stability after assembling; moreover, the manufactures normally directly lock the mud-guards on the frame of the bicycle with screws only taking advantage of the thin lugs welded to the mud-guards, in this way, after tossing and vibration during long term riding, such simple locking mode with the thin lugs practically can not afford the normal and deviated action force introduced at the ends of the mud-guards with a long arciform length, there may be troubles of loosening, or even breaking and damage due to overly concentric stresses or deviation of stresses.

In view of these, some manufacturers were much afraid of inferior stability, and added side strips at the center of the wheel axles near the ends of the mud-guards, in order to help supporting of the mud-guards; this may secure the mud-guards more stably, however, the wheels are adversely provided with complexity and are damaged in aesthetical beauty.

Specifically, under the tendency of designing requesting delicacy nowadays, it is the indication that the manufacturers in the field of alloy components such as for bicycles shall do their best to get rid of unnecessary parts and increasing solidification of all the parts.

SUMMARY OF THE INVENTION

Therefore, the primary object of the present invention is to provide a connecting cantilever structure for the mud-guards with shelves on a bicycle which are tightly contracted and fixed on the lower pipe end of the post pipe of the bicycle seat, the connecting cantilevers of such connecting cantilever structure are used to lock and support the mud-guards on the tops of the wheels which mud-guards are integrately connected with their corresponding shelves, they can absorb stresses to get enhanced stability for the mud-guards in single point locking.

Another object of the present invention is to effect complete absorbsion of stresses from the normal and deviated action force introduced at the ends of the mud-guards in taking advantage of the forged reinforced walls (which are in the shape of an inversed "U" and in an unsymmetric undulated shape) in the connecting cantilevers.

Another object of the present invention is to obtain option for adjustable displacement in locking of the mud-guards in the slots having stroke lengths provided on the top surfaces of connecting cantilevers.

A further object of the present invention is to use the post pipe of the bicycle seat for supporting a rack for the purpose of placing articles after assembling of the connecting cantilevers of the present invention.

Following the objects stated above, the present invention will be apparent after reading the detailed description of the preferred embodiment thereof in reference to the accompanying drawings.

DETAILED DESCRIPTION OF THE PREFERRED EMBODIMENT

Figure 1:
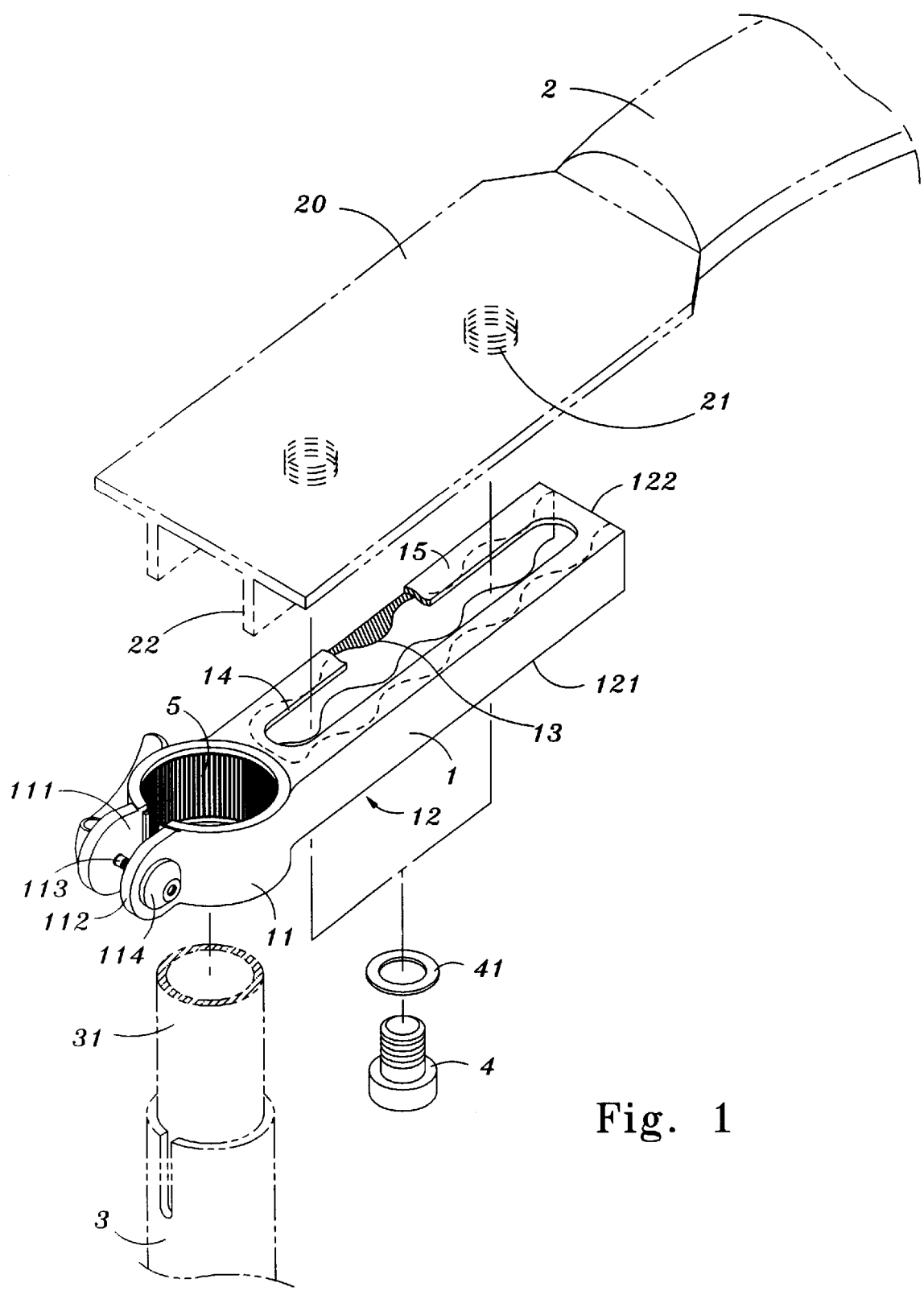
FIG. 1 is an analytical perspective view of the present invention.

Referring firstly to FIG. 1, the connecting cantilever 1 of the present invention is directly closed die forged on a contracting annulus 11 exactly above a mud-guard 2 to be assembled on a bicycle wheel.

The contracting annulus 11 is slipped over the pipe 3 for mounting the seat post pipe 31 of the bicycle seat on the bicycle frame. The contracting annulus 11 is provided therein with a "C" shaped stress delivery ring 5. By contracting of the annulus 11 onto the seat post pipe 31 in the pipe 3 through the "C" shaped ring 5, the bicycle seat can be adjustably displaced and positioned on a suitable level. Therefore, the annulus 11 is provided at one side thereof with an opening 111, two lateral lugs 112 are provided oppositely at both lateral sides of the opening 111, in order to be extended therethrough by a quick release bolt or a normal screw 113 which is screw connected with a nut 114 to clamp and contract the annulus 11 and the "C" shaped ring 5 to reduce the diameter of the latter, so that it can tightly clamp the post pipe 31 of the bicycle seat in the pipe 3; stability can thus be obtained after assembling.

In the present invention, the connecting cantilever 1 is integrately formed with and extended out of the annulus 11 and is forged to form an inversed "U" groove 12 of which the bottom 121 and the tailing end 122 are all opened and the lateral inner side walls are all forged to form unsymmetric undulated and reinforced walls 13, the top surface 15 thereof is formed to be provided with a slot 14 having a stroke length.

Figure 2:
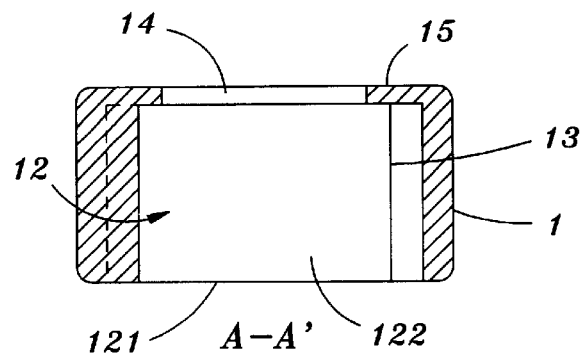
FIG. 2 is a schematic sectional side view of one of the connecting cantilevers of the present invention.
Figure 3:
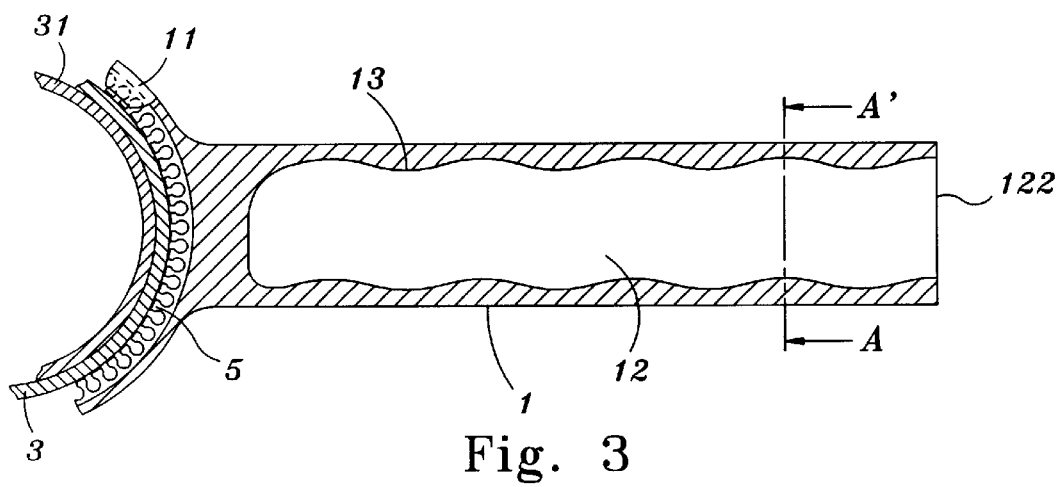
FIG. 3 is a top view of the connecting cantilever of the present invention.
Figure 4:
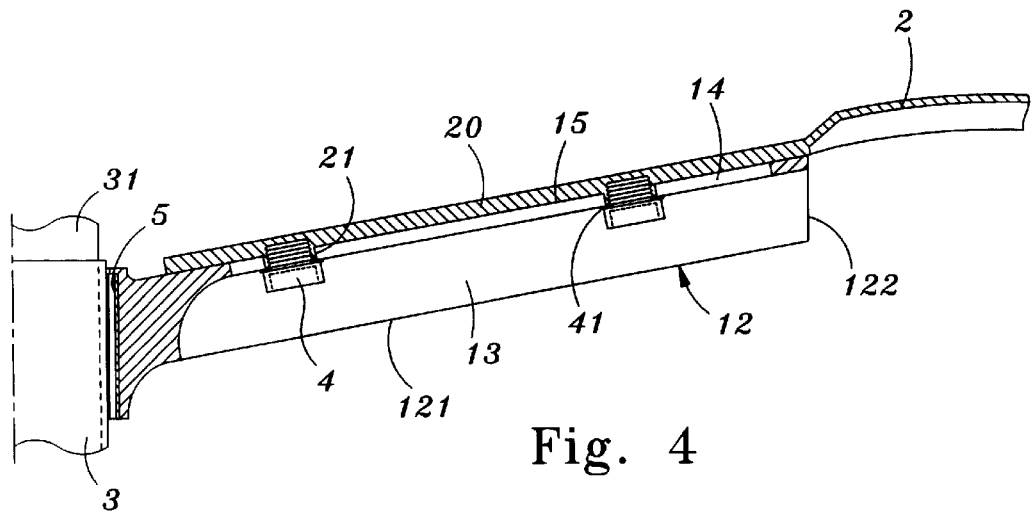
FIG. 4 is a schematic sectional side view showing the connecting cantilever of the present invention in mounting and locking a mud-guard.

FIG. 2 depicts the shape of the inversed "U" groove 12; while FIG. 3 shows the shape of the unsymmetric undulated and reinforced walls 13; and as shown in FIG. 4, a screw 4 and a gasket 41 are locked mutually in the slot 14 to mount a mud-guard 2 through a screw hole 21 on a shelf 20, the shelf 20 is integrately formed on one end of the mud-guard 2 on which the bottom is formed with two down pending plates 22 used to mount the shelf 20 with its mud-guard 2 on the connecting cantilever 1; by the fact that the slot 14 has a stroke length, the mud-guard 2 its shelf 20 can be locked at a suitable chosen position; and both the lateral top surfaces of the slot 14 can also support and contact the bottom surface of the shelf 20 between the plates 22 to increase stability of the mud-guard 2 after assembling; however, the most important is, the inversed "U" groove 12 formed by forging in the connecting cantilever 1 and the lateral inner unsymmetric undulated and reinforced walls 13 can effect complete absorbsion of the stresses from the normal and deviated action force introduced at the ends of the mud-guards 2.

In conclusion, the connecting cantilever structure of the present invention can be used on the mud-guard on the rear wheel of a bicycle, and can be used on the mud-guard on the front wheel or other locations for mounting a mud-guard on the bicycle as well, difference is only resided in the mode of contracting or positioning of an annulus 11, therefore, such changes and modifications of the annulus 11 fall in the scope of the present invention.

Having thus described the technical structure of my invention, what I claim as new and desire to be secured by Letters Patent of the United States is:

1. A connecting cantilever structure for bicycle mud-guards comprising:

an inversed U groove shaped connecting cantilever with a contracting annulus that provides an adjustable affixing means adapted to receive a seat post pipe of a bicycle, said offering means coupled to a mounting shelf with a curved mudguard formed integrally to said mounting shelf; wherein said connecting cantilever is formed with a flat upper surface and two side walls extending downward therefrom, a bottom and tailing end of said connecting cantilever are open, said side walls of said connecting cantilever include a lateral unsymetric undulated inner side walls for increased strength and rigidity so that said inner surfaces of said side walls are reinforced for support of said connecting cantilever, and said connecting cantilever comprises a longitudinal slot in an upper surface thereof, a releasable securing means extends through said slot and is received in a fixed receiving means said mounting shelf so that a position of said mounting shelf, and therefore a position of said mudguard, can be adjusted relative to the seat post pipe of the bicycle, in a longitudinal direction along the said slot.

* * * * *